(12) United States Patent
Chang et al.

(10) Patent No.: US 9,226,118 B2
(45) Date of Patent: Dec. 29, 2015

(54) MOBILE DEVICE AND CONTROL METHOD OF THE SAME

(71) Applicant: Samsung Electronics Co., Ltd., Gyeonggi-do (KR)

(72) Inventors: Woo-yong Chang, Gyeonggi-do (KR); Sun-ae Kim, Seoul (KR); Hyung-rae Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 172 days.

(21) Appl. No.: 13/911,573

(22) Filed: Jun. 6, 2013

(65) Prior Publication Data

US 2013/0273961 A1     Oct. 17, 2013

Related U.S. Application Data

(63) Continuation-in-part of application No. 12/913,383, filed on Oct. 27, 2010.

(30) Foreign Application Priority Data

Oct. 30, 2009   (KR) .................. 10-2009-0104430

(51) Int. Cl.
*H04W 4/08*       (2009.01)
*A63F 13/30*      (2014.01)
*H04L 12/18*      (2006.01)
(Continued)

(52) U.S. Cl.
CPC ................. *H04W 4/08* (2013.01); *A63F 13/12* (2013.01); *H04L 12/1822* (2013.01); *H04N 21/41407* (2013.01); *H04N 21/4532* (2013.01); *H04N 21/4788* (2013.01); *A63F 2300/406* (2013.01); *H04L 12/581* (2013.01); *H04L 51/04* (2013.01); *H04L 67/104* (2013.01);
(Continued)

(58) Field of Classification Search
None
See application file for complete search history.

(56) References Cited

U.S. PATENT DOCUMENTS 6,088,435 A    7/2000 Barber et al.
6,287,200 B1   9/2001 Sharma
(Continued)

FOREIGN PATENT DOCUMENTS

CN    1795691    6/2006
CN    101312419  11/2008
(Continued)

OTHER PUBLICATIONS

Chinese Office Action dated Jun. 23, 2014 issued in a counterpart Application No. 201080048618.5.

(Continued)

*Primary Examiner* — Gerald Johnson
(74) *Attorney, Agent, or Firm* — The Farrell Law Firm, P.C.

(57) ABSTRACT

Disclosed is a mobile device which voluntarily and easily forms a network under a ubiquitous environment to perform various services and a control method of the same, the mobile device is provided, which includes a communication unit which communicates with at least one counterpart mobile device; a signal processing unit which processes a signal transmitted and received through the communication unit; a display unit which displays an image based on the signal processed by the signal processing unit; a user input unit which receives input by a user; and a controller which controls the communication unit to transmit request signals and perform the community activity with at least one counterpart mobile device.

20 Claims, 10 Drawing Sheets

(51) Int. Cl.
*H04N 21/414* (2011.01)
*H04N 21/45* (2011.01)
*H04N 21/4788* (2011.01)
*H04L 12/58* (2006.01)
*H04W 84/18* (2009.01)
*H04L 29/08* (2006.01)

(52) U.S. Cl.
CPC ....... *H04L 67/1046* (2013.01); *H04M 2250/62* (2013.01); *H04W 84/18* (2013.01)

(56) References Cited

U.S. PATENT DOCUMENTS

| | | | |
|---|---|---|---|
| 7,769,409 | B2 | 8/2010 | Harris et al. |
| 8,041,374 | B2 | 10/2011 | Miwa et al. |
| 8,244,550 | B2 | 8/2012 | Sim et al. |
| 2007/0030824 | A1* | 2/2007 | Ribaudo et al. ............... 370/328 |
| 2007/0082659 | A1 | 4/2007 | Nevalainen |
| 2007/0121818 | A1 | 5/2007 | Iwami et al. |
| 2008/0126113 | A1 | 5/2008 | Manning et al. |
| 2010/0153521 | A1* | 6/2010 | Lor et al. ....................... 709/219 |
| 2010/0317419 | A1 | 12/2010 | Osborne |

FOREIGN PATENT DOCUMENTS

| | | |
|---|---|---|
| CN | 101521874 | 9/2009 |
| EP | 1 253 540 | 10/2002 |
| JP | 2005-319047 | 11/2005 |
| JP | 2007-013704 | 1/2007 |
| JP | 2007-089025 | 4/2007 |
| JP | 2007-104464 | 4/2007 |
| JP | 2008-504733 | 2/2008 |
| JP | 2008-268308 | 11/2008 |
| KR | 2003-195969 | 7/2003 |
| KR | 1020060083196 | 7/2006 |
| KR | 1020060129892 | 12/2006 |
| KR | 1020080017968 | 2/2008 |

OTHER PUBLICATIONS

Japanese Office Action dated Sep. 2, 2014 issued in a counterpart Application No. 2012-536669.
Australian Examination Report dated Sep. 8, 2014 issued in a counterpart Application No. 2010314008.
Chinese Office Action dated Feb. 9, 2015 issued in a counterpart Application No. 201080048618.5.
Chinese Office Action dated Sep. 14, 2015 issued in a counterpart Application No. 201080048618.5, 11 pages.
Korean Office Action dated Oct. 30, 2015 issued in counterpart application No. 10-2009-0104430, 8 pages.

* cited by examiner

——— REQUEST FOR PARTICIPATION IN NETWORK
— — PARTICIPATE IN NETWORK

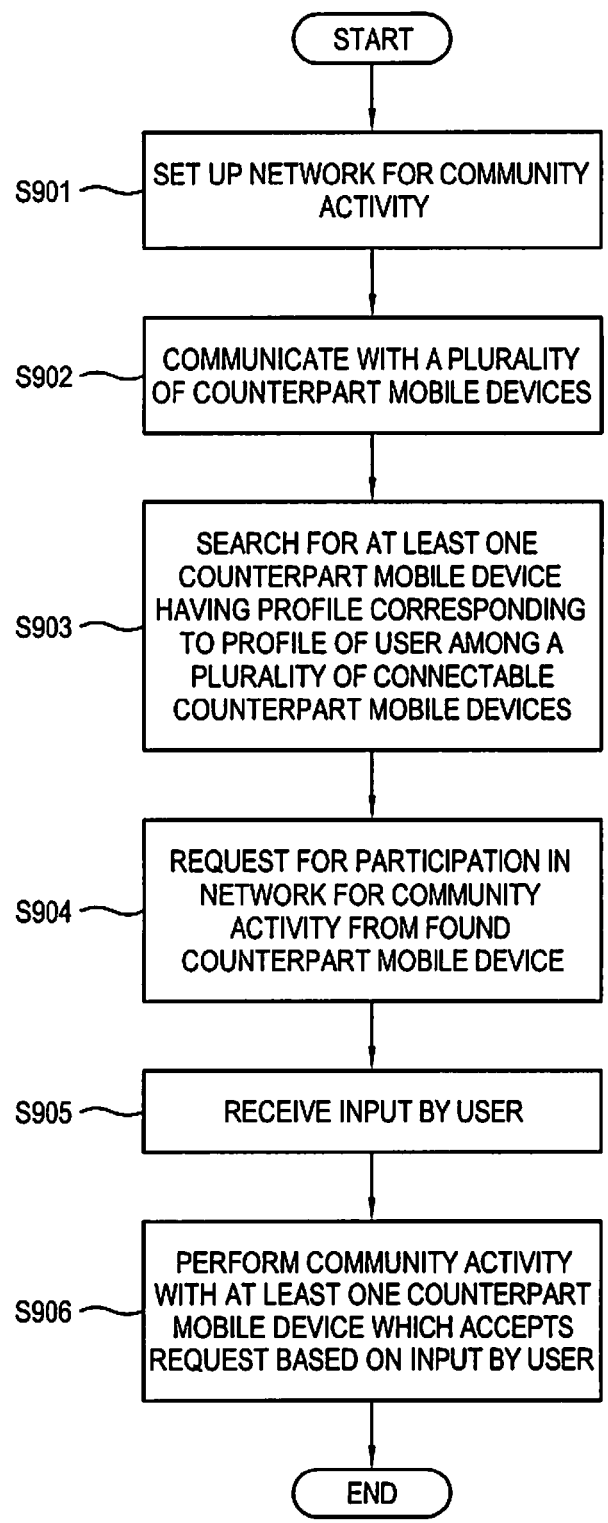

MOBILE DEVICE AND CONTROL METHOD OF THE SAME

PRIORITY

This application is a Continuation in Part of U.S. patent application Ser. No. 12/913,383, which was filed in the U.S. Patent and Trademark Office on Oct. 27, 2010, and claims priority under 35 U.S.C. §119(a) to Korean Patent Application No. 10-2009-0104430, which was filed in the Korean Intellectual Property Office on Oct. 30, 2009, the disclosure of each of which is incorporated herein by reference.

BACKGROUND OF THE INVENTION

1. Field of the Invention

The present invention relates generally to a mobile device and a control method of the same, and more particularly, to a method and apparatus in which a mobile device voluntarily and easily forms a network under a ubiquitous environment to perform various services.

2. Description of the Related Art

Generally, a plurality of users connected to a network form a community and may communicate with each other. Conventionally, a network for community activity may be set up in a state where communication is enabled with prior consent, such as network for community activity set up by users connected to a server providing a service. However, a more convenient method of constituting a network between groups is desired.

SUMMARY OF THE INVENTION

Accordingly, the present invention provides a mobile device, which voluntarily and easily forms a network under a ubiquitous environment, to perform various services and a control method of the same.

According to an embodiment of the present invention, a mobile device comprising: a communication unit which communicates with at least one counterpart mobile device; a user input unit which receives an input from a user; a user interface (UI) generating unit which generates a first UI for performing an activity with the at least one counterpart mobile device participating in a group network within the at least one counterpart mobile device, wherein the first UI comprises a first sub-menu for selecting at least one activity from the at least one activity being performed by the at least one counterpart mobile device participating in the group network and a second sub-menu for selecting at least one counterpart mobile device to perform the selected activity; a display unit which displays the first UI generated by the UI generating unit thereon; and a control unit which controls to perform the selected activity with the selected counterpart mobile device, when the user's input through the first UI is received.

According to an aspect of another exemplary embodiment, the controller may control the communication unit to transmit the request signal for the participation in the network when a signal to allow constituting the network for the community activity is received through the user input unit.

According to an aspect of another exemplary embodiment, the UI generating unit may generate a second UI for requesting to participate in the group network to the at least one counterpart mobile device, and the control unit may control to transmit the request to participate in the group network to the at least one counterpart mobile device selected through the second UI.

According to an aspect of another exemplary embodiment, the second UI may display an icon of at least one counterpart mobile device having a profile corresponding to a user profile within the at least one counterpart mobile device.

According to an aspect of another exemplary embodiment, the user profile may comprise at least one of an application being implemented, content being implemented, a preferred application, and preferred content.

According to an aspect of another exemplary embodiment, the at least one of the first UI or the second UI may comprise a third sub-menu for setting the right of performing the activity of the at least one mobile device participating in the group network.

According to an aspect of another exemplary embodiment, the second sub-menu comprises a sub-menu for selecting at least one sub-group each of which comprising at least one counterpart mobile device to perform the selected activity, and the sub-groups are classified on the basis of the right of performing the activity set through the third sub-menu.

According to an aspect of another exemplary embodiment, the UI generating unit may display a sub-menu for selecting at least one mobile device included in the selected sub-group, when at least one sub-group is selected from the sub-groups through the second sub-menu.

According to an aspect of another exemplary embodiment, the first UI may comprise a fourth sub-menu for requesting to participate in the group network to at least one counter mobile device which does not participate in the group network within the at least one counterpart mobile device.

According to an aspect of another exemplary embodiment, the UI generating unit may output a notice, when device information of any one of the at least one counterpart mobile device participating in the group network is changed.

According to an aspect of another exemplary embodiment, the community activity may comprise at least one of joint implementation of an application, sharing content implemented by any user with another user, transmitting and receiving content between users, joint implementation of a game, joint chatting, an activity where a plurality of users watch a broadcast reproduced by any user at the same time, and an activity where any user transmits content to a plurality of users in a broadcasting method.

The foregoing and/or other aspects of the present invention may be achieved by providing a method of providing a mobile device with a user interface (UI), the method comprising: displaying a first UI for performing an activity with the at least one counterpart mobile device participating in a group network within the at least one counterpart mobile device, wherein the first UI comprising a first sub-menu for selecting at least one activity from the at least one activity being performed with the at least one counterpart mobile device participating in the group network and a second sub-menu for selecting at least one counterpart mobile device to perform the selected activity; receiving a selection of at least one activity through the first sub-menu; receiving a selection of at least one counterpart mobile device through the second sub-menu; and performing the selected activity with the selected counterpart mobile device according to the selection through the first UI.

According to an aspect of another exemplary embodiment, the method may further comprise generating a second UI for requesting to participate in the group network to the at least one counterpart mobile device; and transmitting the request to participate in the group network to the at least one counterpart mobile device selected through the second UI According to an aspect of another exemplary embodiment, the method may further comprise displaying a sub-menu for selecting at least one mobile device included in the selected sub-group, when at least one sub-group is selected from the sub-groups through the second sub-menu.

According to an aspect of another exemplary embodiment, the method may further comprise outputting a notice, when device information of the at least one counterpart mobile device participating in the group network is changed.

BRIEF DESCRIPTION OF THE DRAWINGS

The above and other aspects, features and advantages of certain embodiments of the present invention will become apparent and more readily appreciated from the following description taken in conjunction with the accompanying drawings, in which:

FIG. 9 is a diagram illustrating a control method of a mobile device according to an embodiment of the present invention.

DETAILED DESCRIPTION OF THE EMBODIMENTS OF THE PRESENT INVENTION

Figure 1:
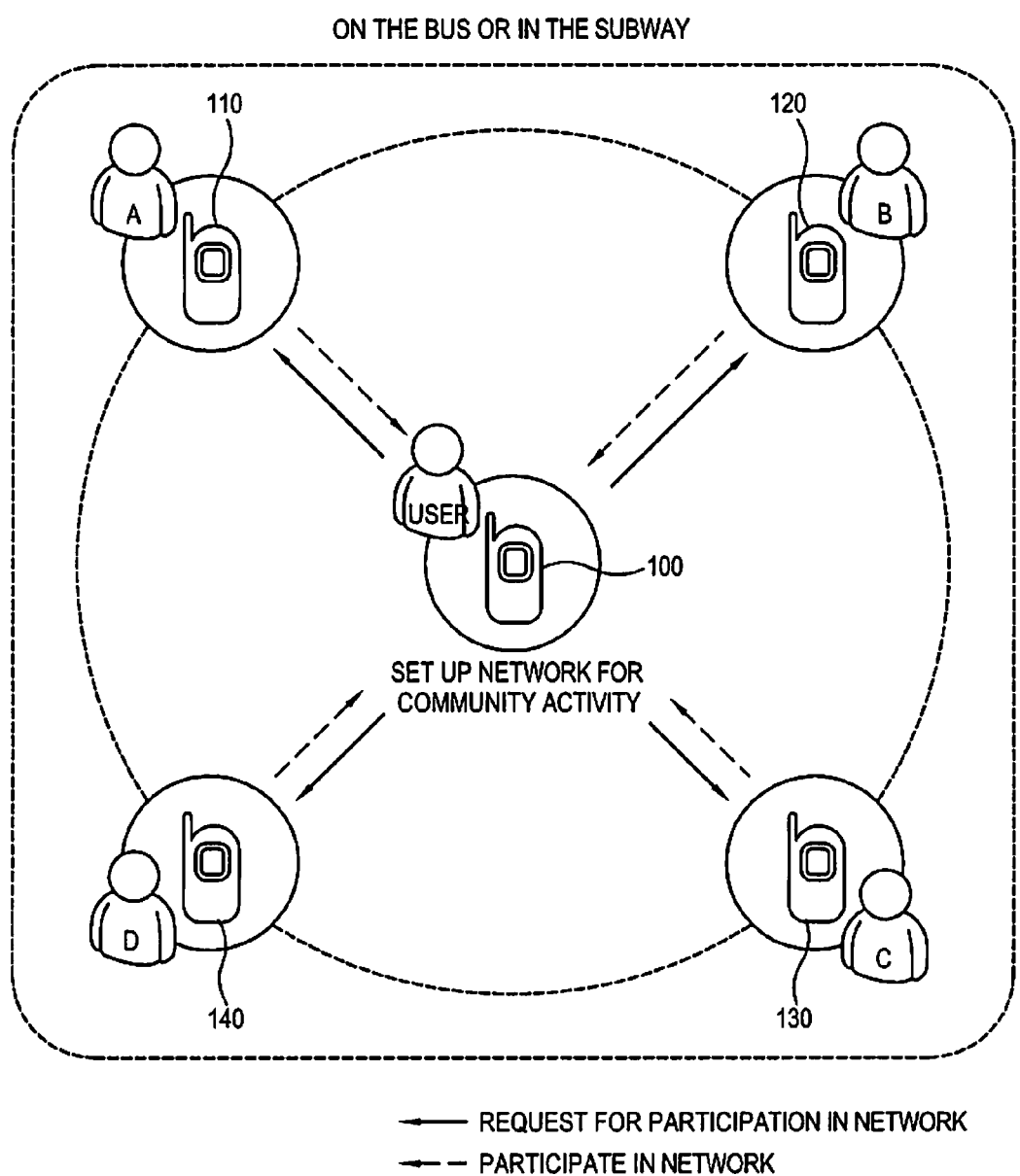
FIG. 1 is a diagram schematically illustrating a configuration of a network for a community activity according to an embodiment of the present invention.

Hereinafter, embodiments of the present invention will be described in detail with reference to accompanying drawings so as to be easily understood by a person having ordinary skill in the art. Various changes and modifications of the embodiments described herein can be made without departing from the scope and spirit of the invention. In addition, descriptions of well-known functions and parts are omitted for clarity, and similar reference numerals will be understood to refer to similar elements, features and structures throughout the drawings. FIG. 1 schematically illustrates a configuration of a network for a community activity according to an embodiment of the present invention.

When a user performs a community activity with a plurality of unspecified counterparts existing in the same space, for example on the bus or in the subway, the user sets up a network for a community activity, for example a game room, using his or her mobile device 100. The user searches for a counterpart to participate in the network and to perform the community activity among the plurality of counterparts existing in the same place. Specifically, user's mobile device 100 communicates with mobile devices of the counterparts to search for counterpart mobile devices, which satisfy a predetermined condition. For example, user's mobile device 100 may search for a mobile device of a counterpart playing a game, a mobile device of a counter part playing the same game as that to be played in the set up game room, and the like. In FIG. 1, mobile device 110 of counterpart A, mobile device 120 of counterpart B, mobile device 130 of counterpart C, and mobile device 140 of counterpart D are found.

The user may then request that a found counterpart participate in the network. In FIG. 1, mobile device 100 of the user requests that device 110 of counterpart A, mobile device 120 of counterpart B, mobile device 130 of counterpart C, and mobile device 140 of counterpart D participate in the network.

Here, when a counterpart accepts the request and participates in the network, the user performs the community activity with the at least one counterpart mobile device. That is, in FIG. 1, the mobile device 100 of the user plays the game with device 110 of counterpart A, mobile device 120 of counterpart B, mobile device 130 of counterpart C, and mobile device 140 of counterpart D.

Figure 2:
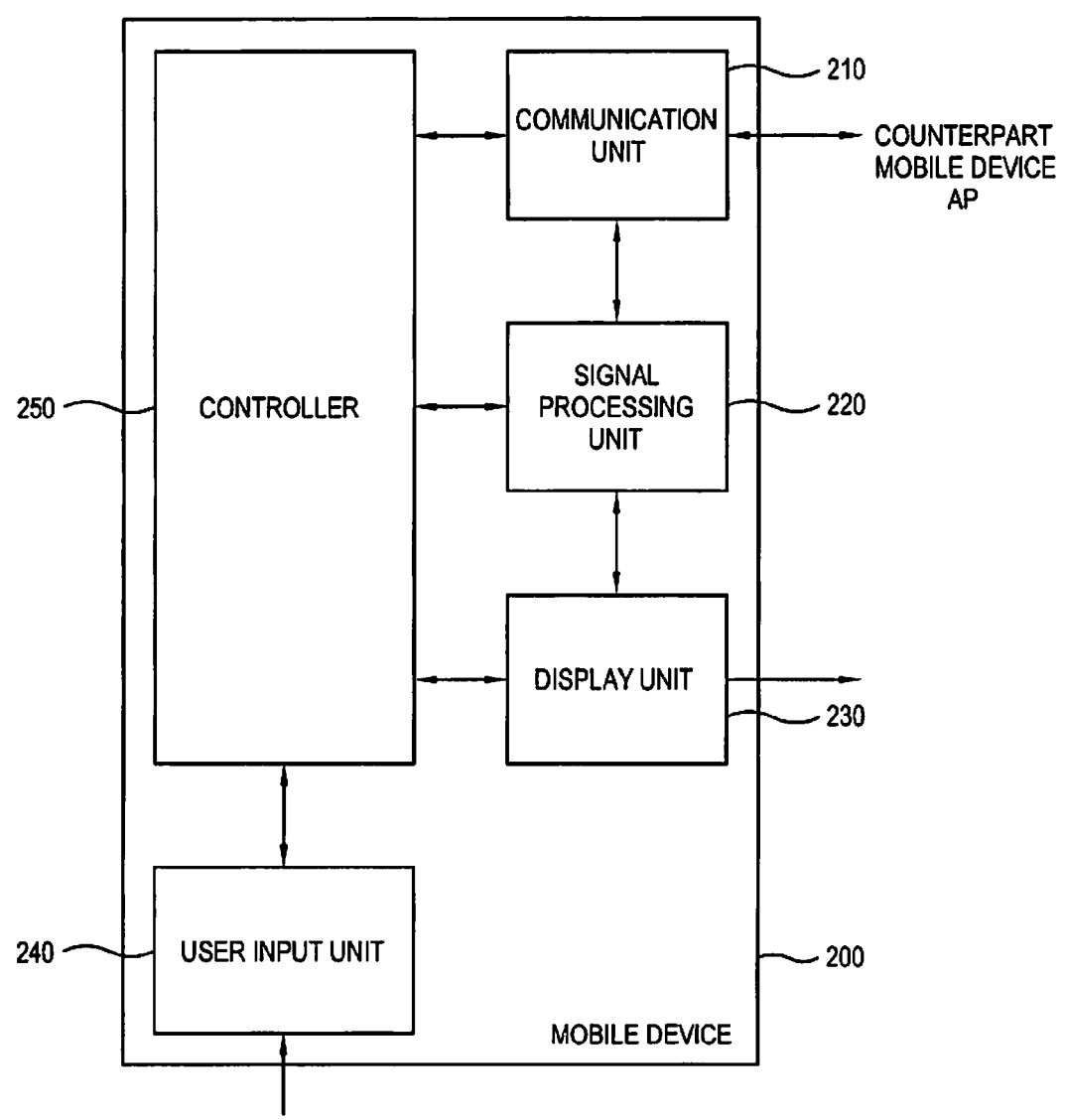
FIG. 2 is a block diagram of a mobile device according to an embodiment of the present invention.

FIG. 2 is a block diagram of a mobile device according to an embodiment of the present invention.

The mobile device 200 according to the present embodiment may be a mobile terminal, a laptop computer, a personal digital assistant (PDA), an MP3 (MPEG audio layer-3) player, and the like. Further, mobile device 200 according to the present embodiment may include any electronic device carried by the user and capable of communicating with other mobile devices.

Mobile device 200 according to the present embodiment includes a communication unit 210, a signal processing unit 220, a display unit 230, a user input unit 240, and a controller 250. Communication unit 210 communicates with a plurality of counter mobile devices.

According to one embodiment, communication unit 210 performs communication via Wi-Fi, Bluetooth®, and Zigbee to constitute an ad hoc network with the plurality of counterpart mobile devices. Here, communication unit 210 includes Wi-Fi, Bluetooth® and Zigbee communication modules.

Alternatively, communication unit 210 performs mobile communication, such as wireless local area network (WLAN), 3G, 3G transitional, and 4G communication, to constitute an infrastructure network with the plurality of counterpart mobile devices. Here, communication unit 210 includes a WLAN communication module, a 3G communication module, a 3G transitional communication module, and a 4G communication module.

The signal processing unit 220 processes a signal transmitted and received through communication unit 210. For example, signal processing unit 220 may perform encoding, decoding, and demodulation of a signal.

The display unit 230 displays an image based on a signal processed by signal processing unit 220. Here, display unit 230 may include a display panel configured as a Liquid Crystal Display (LCD), an Organic Light Emitting Display (OLED), a Plasma Display Panel (PDP), and the like.

The user input unit 240 receives input by a user. In detail, the input by the user may be associated with a network for a community activity. For example, the input may include setting up the network, searching for participants in the network, a community activity, or terminating the network.

Here, user input unit 240 may receive user's input through a touch screen, a touch pad, or a button of mobile device 200.

Controller 250 controls communication unit 210 to request that at least one counterpart mobile device having a profile corresponding to a profile of the user participates in the network for the community activity among a plurality of connectable counterpart mobile devices. Prior to the request, controller 250 controls communication unit 210 to request participation in the network when a signal allowing constitution of the network for the community activity is received from the user through user input unit 240.

Controller 250 controls communication unit 210 to search for at least one counterpart mobile device having a profile corresponding to the profile of the user. Here, controller 250 controls communication unit 210 to transmit a request signal for the profile of at least one counterpart mobile device to the mobile device existing within a predetermined range. Here, the predetermined range may include a preset range of physical distance from the mobile device. Controller 250 receives the profile from at least one counterpart mobile device in response to the request signal and selects at least one counterpart mobile device having a profile corresponding to the profile of the user among the received profiles. Controller 250 enables display unit 230 to display a list or an icon of at least one selected counterpart mobile device. Controller 250 may control communication unit 210 to transmit a request signal for participation in the network for the community activity to a counterpart mobile device selected through user input unit 240 from a list of at least one displayed counterpart mobile device.

According to an embodiment of the present invention, controller 250 transmits a request signal for a profile to a plurality of connectable counterpart mobile devices, identifies whether a received profile in response to the request signal corresponds to the profile of the user, and determines a candidate counterpart mobile device to constitute the network for the community activity. Alternatively, controller 250 transmits a request signal for a profile to each counterpart mobile device, identifies whether a received profile in response to the request signal corresponds to the profile of the user, and determines a candidate counterpart mobile device to constitute the network for the community activity.

The profile of the user may include an application being implemented, content being implemented, a preferred application, or preferred content. The application may include a game, listening to music, chatting, instant messaging, watching movies, or watching broadcasts. The content may include an image, a video, an audio file, or a text.

The community activity may be various activities performed by users having corresponding profiles. In detail, community activity may include joint implementation of an application, sharing content implemented by a user with another user, transmitting and receiving content between users, and the like. For example, joint implementation of the application may be activity where a plurality of users plays an online game or chat. Sharing content implemented by the user with the other user may be an activity where a plurality of users watch a video reproduced by a user at the same time. Transmitting and receiving content between users may be an activity where a user transmits an audio file to a plurality of users in a broadcasting method.

According to an embodiment of the present invention, the network for the community activity is connected in an ad hoc mode, which will be described with reference to FIG. 3. Alternatively, the network for the community activity is connected in an infrastructure mode, which will be described with reference with FIG. 4.

Mobile device 200 may constitute a network with a plurality of counterpart mobile devices in various processes.

Mobile device 200 connects to all found counterpart mobile devices and may disconnect from counterparts, which do not accept a request for participation. Here, controller 250 controls communication unit 210 to connect to at least one counterpart mobile device having a profile corresponding to the profile of the user and then to terminate connection to a counterpart mobile device which does not accept the request. Alternatively, mobile device 200 identifies whether each found counterpart mobile device accepts a request in participation one to one and then connects. Here, controller 250 controls communication unit 210 to connect to a counterpart mobile device, which accepts the request when at least one counterpart mobile device having a profile corresponding to the profile of the user accepts the request.

Controller 250 may control communication unit 210 to perform community activity with at least one counterpart mobile device, which accepts the request for participation in the network for the community activity based on input by the user.

Mobile device 200 may receive a request to participate in a network for a community activity from a counterpart mobile device. Here, controller 250 may control communication unit 210 to perform the community activity with at least one counterpart mobile device based on input by the user when participating in the network for the community activity requested by at least one counter part mobile among a plurality of connectable counterpart mobile devices.

Controller 250 may control communication unit 210 to transmit an acceptance signal corresponding to a request signal for participation in the network for the community activity and to perform the community activity with at least one counterpart mobile device based on the input by the user when the request signal is received from a counterpart mobile device among at least one connectable counterpart mobile devices. Controller 250 may control communication unit 210 to transmit the acceptance signal when a signal to allow constituting the network for the community activity is received through the user input unit 240. Further, controller 250 may control communication unit 210 to transmit a profile corresponding to a request signal when the request signal for a profile is received from at least one counterpart mobile device.

Figure 3:
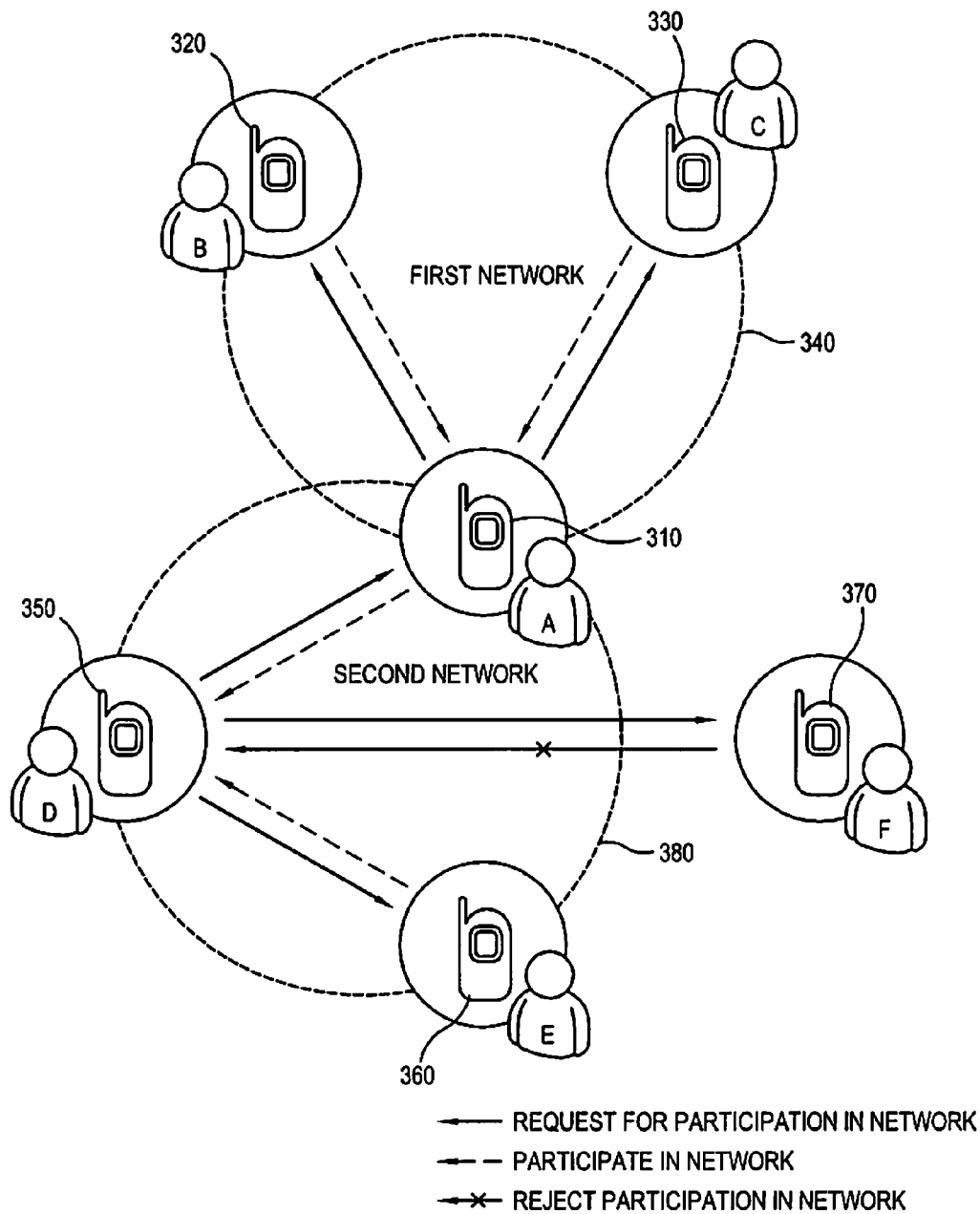
FIG. 3 is a diagram illustrating a network for a community activity connected in ad hoc mode.

FIG. 3 illustrates a network for a community activity connected in ad hoc mode.

An ad hoc network is an infrastructure-free network that enables nodes to wirelessly communicate with each other without relying on a base station or an access point (AP). That is, each node constituting the ad hoc network directly routes packets to another node without passing through the AP. Thus, the ad hoc network does not need a base station or an AP. In the ad hoc network, since nodes transfer freely, network topology changes dynamically. Further, each node may perform as a server or a client. The ad hoc network may be configured by Wi-Fi, Bluetooth®, and Zigbee communication.

Referring to FIG. 3, a mobile device 310 of A sets up a first network 340 for a community activity. Here, mobile device 310 of A searches for a counterpart mobile device having a profile corresponding to its own profile. Mobile device 310 of A requests that a found mobile device 320 of B and a found mobile device 330 of C participate in the first network 340. When mobile device 320 of B and mobile device 330 of C accept the request for participation in the first network 340, mobile device 320 of B and mobile device 330 of C are respectively connected to the first network 340 to participate in the community activity. Here, mobile device 320 of B and mobile device 330 of C may respectively perform the community activity with mobile device 310 of A.

Here, mobile device 310 of A functions as a server, and mobile device 320 of B and mobile device 330 of C function as clients.

A mobile device 350 of D may independently set up a second network 380 for another community activity. Here, mobile device 350 of D searches for mobile device 310 of A, a mobile device 360 of E, and a mobile device 370 of F in the same manner and requests that the found mobile devices 310, 360, and 370 participate in the second network 380. In FIG. 3, mobile device 310 of A and mobile device 360 of E accept the request for participation in the second network 380, but mobile device 370 of F rejects the request for participation in the second network 380. Thus, mobile device 350 of D performs the community activity only with mobile device 310 of A and mobile device 360 of E.

In FIG. 3, mobile devices connected via the ad hoc network perform as a server or a client to communicate with each other. For example, mobile device 310 of A is a server in the first network 340 but is a client in the second network 380. The ad hoc network enables a plurality of nodes to be connected one to one and may be formed in a small space without a server. Thus, as shown in FIG. 3, the network may be formed in a small space without a server, such as a subway or a bus, to share and transmit content.

Figure 4:
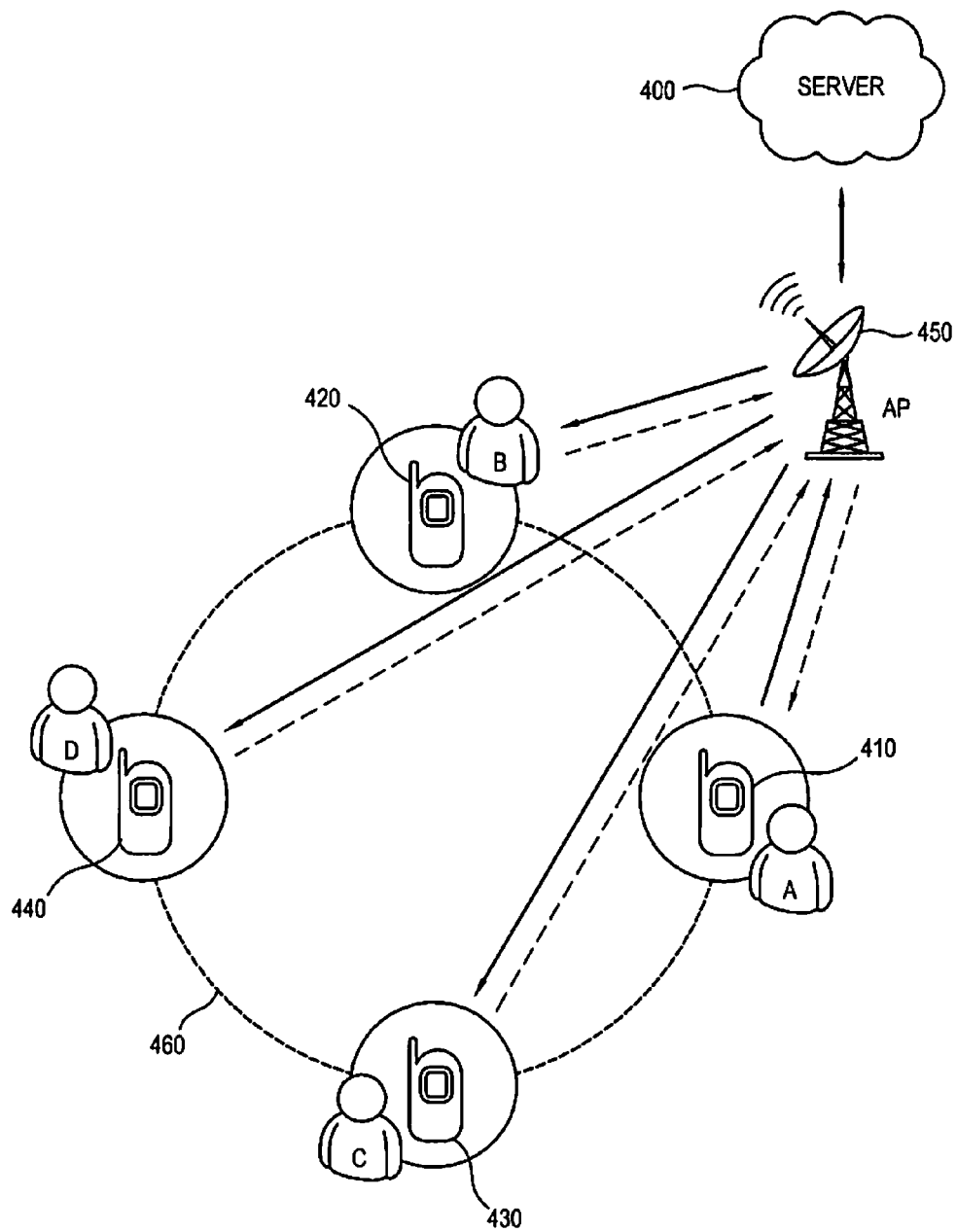
FIG. 4 is a diagram illustrating a network for a community activity connected in infrastructure mode.

FIG. 4 illustrates a network for a community activity connected in infrastructure mode.

An infrastructure network is a network in which a plurality of nodes, positioned within a predetermined range of a base station or AP, constitute one network and communicate with each other. The infrastructure network may be formed by mobile communication such as WLAN communication, 3G communication, 3G transitional communication including long term evolution communication, and 4G communication.

FIG. 4 shows an example of an infrastructure network by WLAN communication via AP relay. A mobile device 410 of A, a mobile device 420 of B, a mobile device 430 of C, and a mobile device 440 of D constitute one network via AP relay, and mobile devices 410, 420, 430, and 440 transmit and receive data with a server 400 through an AP 450.

The mobile device 410 of A requests setup of a network 460 for a community activity from the server 400 through the AP 450. Here, mobile device 410 of A also transmits its own profile. Here, server 400 searches for a counterpart mobile device having a profile corresponding to the received profile of the mobile device 410 of A. In detail, server 400 may search for a counterpart mobile device having a profile corresponding to the profile of mobile device 410 of A among mobile devices connected to the AP 450.

Server 400 finds mobile devices 420, 430, and 440 of B, C, and D having the profile corresponding to mobile device 410 of A among the mobile devices connected to the AP 450 and requests that mobile device 420 of B, mobile device 430 of C, and mobile device 440 of D participate in the network 460 through the AP 450. When mobile device 420 of B, mobile device 430 of C, and mobile device 440 of D receiving the request for the participation in the network 460 transmit an acceptance signal regarding the request for the participation in the network 460 to server 400 through the AP 450, server 400 connects mobile device 420 of B, mobile device 430 of C, and mobile device 440 of D to the network 460 for the community activity through the AP 450. The AP 450 may route a packet transmitted and received between the mobile devices so that the mobile devices constituting the network 460 for the community activity communicate with each other. Accordingly, mobile device 410 of A, mobile device 420 of B, mobile device 430 of C, and mobile device 440 of D may communicate with each other.

When the network 460 for the community activity is connected in infrastructure mode, the network may be enabled by mobile communication via relay of a base station, such as 3G, 3G transitional, and 4G communication.

3G communication is an IMT-2000 system and includes communication performed by cdma2000, WCDMA, CDMA TDD, UWC-136/EDGE, and DECT standards, 3G transitional communication is 3.5G, 3.7G, and 3.9G communication and includes communication performed by HSDPA, HSUPA, LTE, EV-DO, and Mobile WiMAX standards, and 4G communication is an IMT-Advanced system and includes communication performed by LTE Advanced and IEEE 802.16m standards.

Thus, when mobile devices 410, 420, 430, and 440 in FIG. 4 include a module to enable 3G communication, 3G transitional communication, or 4G communication, it is possible to form a network for a community activity through 3G communication, 3G transitional communication, or 4G communication. Here, mobile devices 210, 420, 430, and 440 communicate with server 400 through a base station to relay mobile communication to enable connection of the network for the community activity. Thus, one of the mobile devices 410, 420, 430, and 440 requests setup of the network for the community activity from server 400 through the base station and also transmits its own profile. Server 400 searches for a counterpart mobile device having a profile corresponding to the received profile among the mobile devices connected to the base station and transmits a request signal for participation in the network. When a counterpart mobile device receiving the request signal transmits an acceptance signal, the network for the community activity is set up.

Conventionally, a network for a community activity may be set up in a state where communication is enabled with prior consent. That is, the network for the community activity may be set up by users connected to a server providing a service.

According to the present embodiment, a user sets up a network for a community activity and suggests participation in the network to adjacent users. Accordingly, users existing in the same space may set up an instant network and perform various community activities.

Figure 5A:
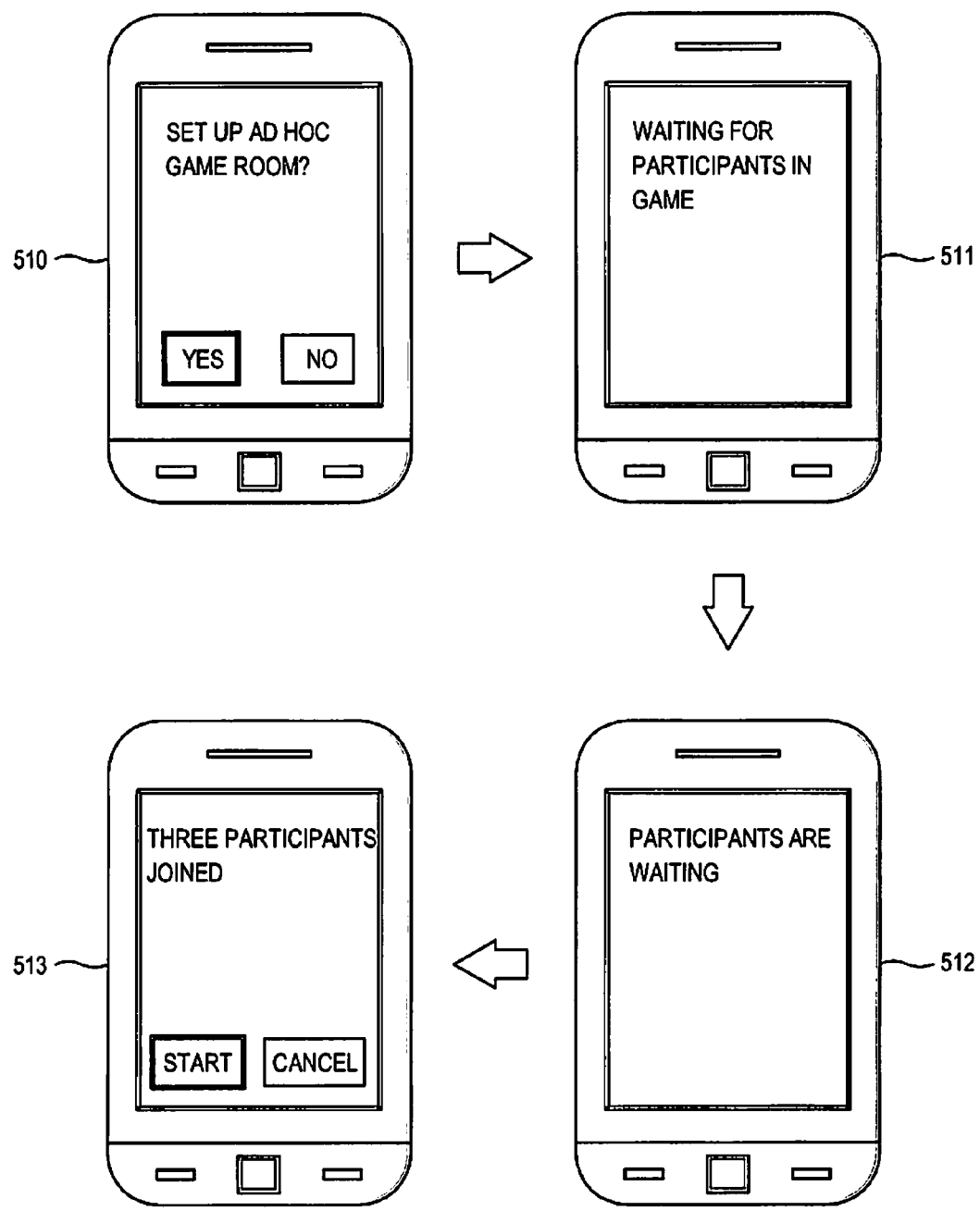
FIG. 5A is a diagram illustrating screen display examples of a mobile device setting up a network for a community activity.

FIG. 5A illustrates examples of screen displays on a mobile device setting up a network for a community activity.

For example, a user may set up a network game, traveling on public transportation. When the user enters a network game setup menu, mobile device 200 displays a screen asking whether to set up a network game. Referring to FIG. 5A, mobile device 200 displays a screen including a phrase "set up ad hoc game room?" a Yes button to select setup of the network game, and a No button to cancel setup of the network game on screen display 510.

When the network is set up, mobile device 200 recruits participants in the game. For example, mobile device 200 searches for a mobile device being implementing a game or a mobile device being implementing the same game to be implemented by the user among adjacent mobile devices, and requests participation in the network from a found mobile device. Here, mobile device 200 displays a phrase "waiting for participants in game" on screen display 511.

When a counterpart mobile device receiving the request for the participation in the network approves the participation in the game, the counterpart mobile device is connected to the network. Here, mobile device 200 and the counterpart mobile device perform one-to-one communication with each other. Further, mobile device 200 displays a phrase "participants are waiting" on the screen on screen display 512.

Then, mobile device 200 may display detailed information about the participants on the screen. For example, as shown in FIG. 5A, a phrase "three participants joined" is displayed. Here, a game start button and a game cancel button may further be displayed. When the user of mobile device 200 selects the game start button, the user starts the game with the approved participants connected to the network on screen display 513.

Figure 5B:
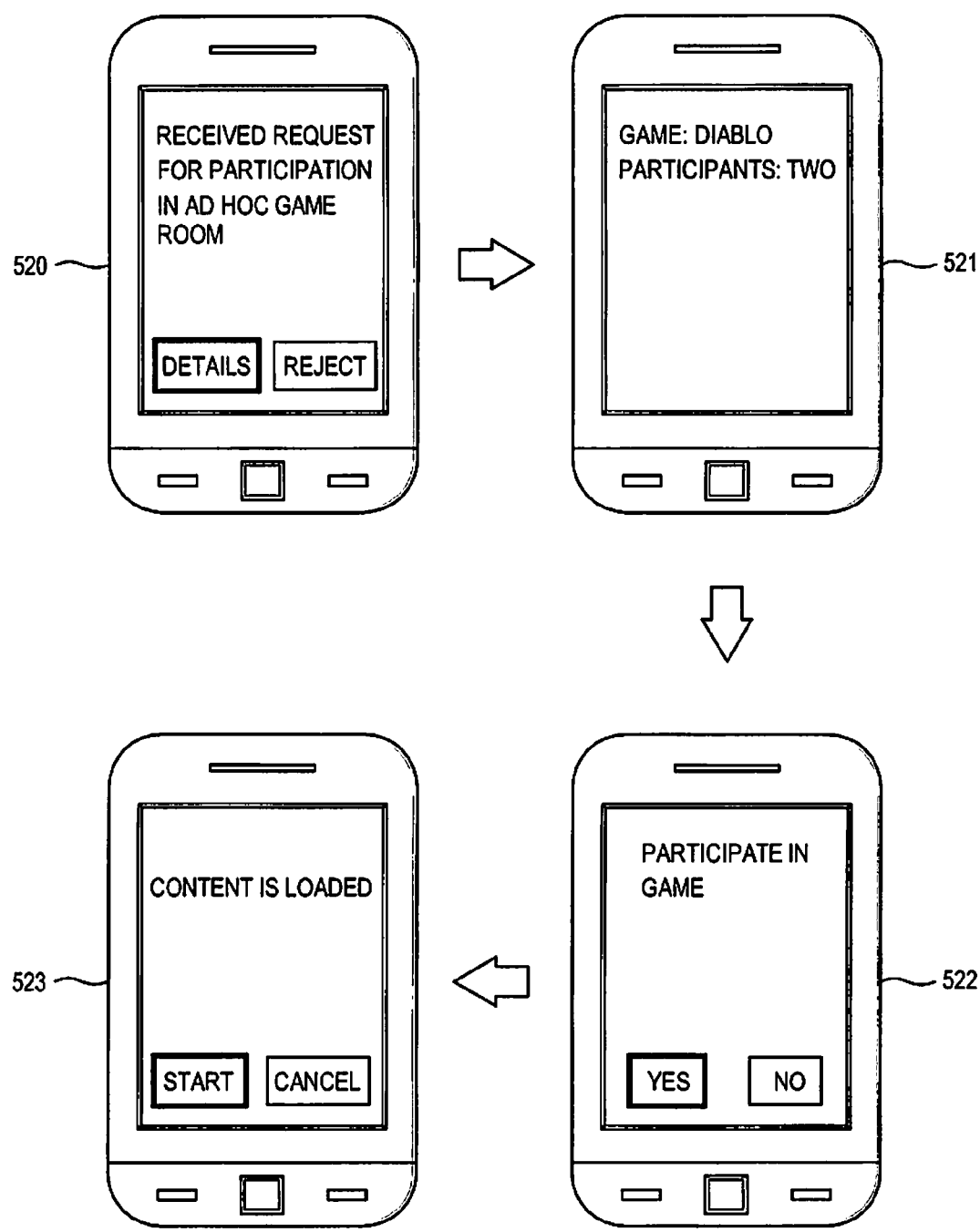
FIG. 5B is a diagram illustrating screen display examples of a mobile device receiving a request for participation in a network.

FIG. 5B illustrates examples of screen displays on a mobile device receiving a request for participation in a network.

For example, a user may receive a request for participation in a network game from an anonymous counterpart while traveling on public transportation. When the request for the participation in the network game is received, mobile device 200 displays a screen to report about the request. Referring to FIG. 5B, mobile device 200 displays a screen including a phrase "received a request for participation in ad hoc game room," a selection button to view details, and a rejection button to reject the request for the participation on screen display 520.

When the user selects the selection button to view the details, mobile device 200 displays detailed information about the ad hoc game room on the screen. In detail, as shown in FIG. 5B, it is displayed that a game to be implemented is Diablo and two participants joined the room (521).

Then, mobile device 200 displays a screen asking whether to participate in a network. With reference to FIG. 5B, a screen including a phrase "participate in game?" a Yes button to select participation in the game, and a No button to reject participation in the game is displayed on screen display 522.

When the user of mobile device 200 selects the Yes button to approve the participation in the game, mobile device 200 is connected to the set-up network. Here, mobile device 200 may be loaded with content to implement the game. When the content is completely loaded, mobile device 200 displays a screen including a phrase "content is loaded," a game start button, and a game cancel button on screen display 523.

Then, when the user of mobile device 200 selects the game start button, the user starts the game with the approved participants connected to the network on screen display 523.

Figure 6:
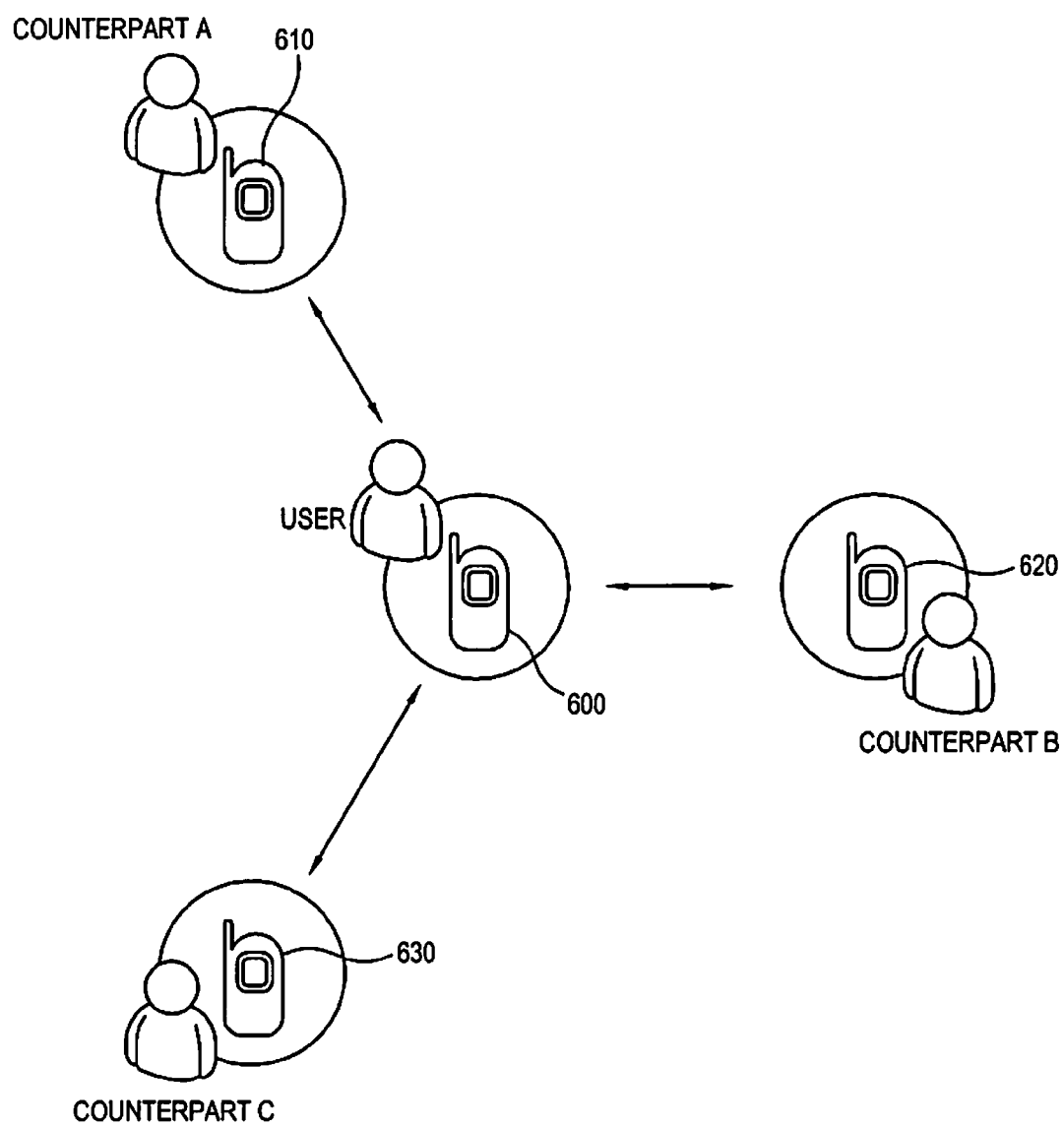
FIG. 6 is a diagram illustrating a community activity network according to an embodiment of the present invention.

FIG. 6 illustrates a network for a community activity according to an embodiment of the present invention.

In FIG. 6, a mobile device 600 of a user setting up a network becomes a server. A mobile device 610 of a counterpart A, a mobile device 620 of a counterpart B, and a mobile device 630 of a counterpart C become a client. Here, the clients do not communicate with each other.

In detail, the mobile device 600 of the user sets up the network and provides an instant DJ service. That is, the user of the mobile device 600 may set up an instant music broadcasting channel to listen to music in the mobile device 600 with the users of the counterpart mobile devices 610, 620, and 630, and share a playlist stored in the mobile device 600 of the user with the counterpart mobile devices 610, 620, and 630 to provide recommendation and purchase services of content.

Here, except for the mobile device 600 of the user, the counterpart mobile devices 610, 620, and 630 do not provide content, and thus the mobile devices 610, 620, and 630 do not serve as a server. Therefore, the mobile device 610 of the counterpart A, the mobile device 620 of the counterpart B, and the mobile device 630 of the counterpart C do not communicate with each other.

Figure 7:
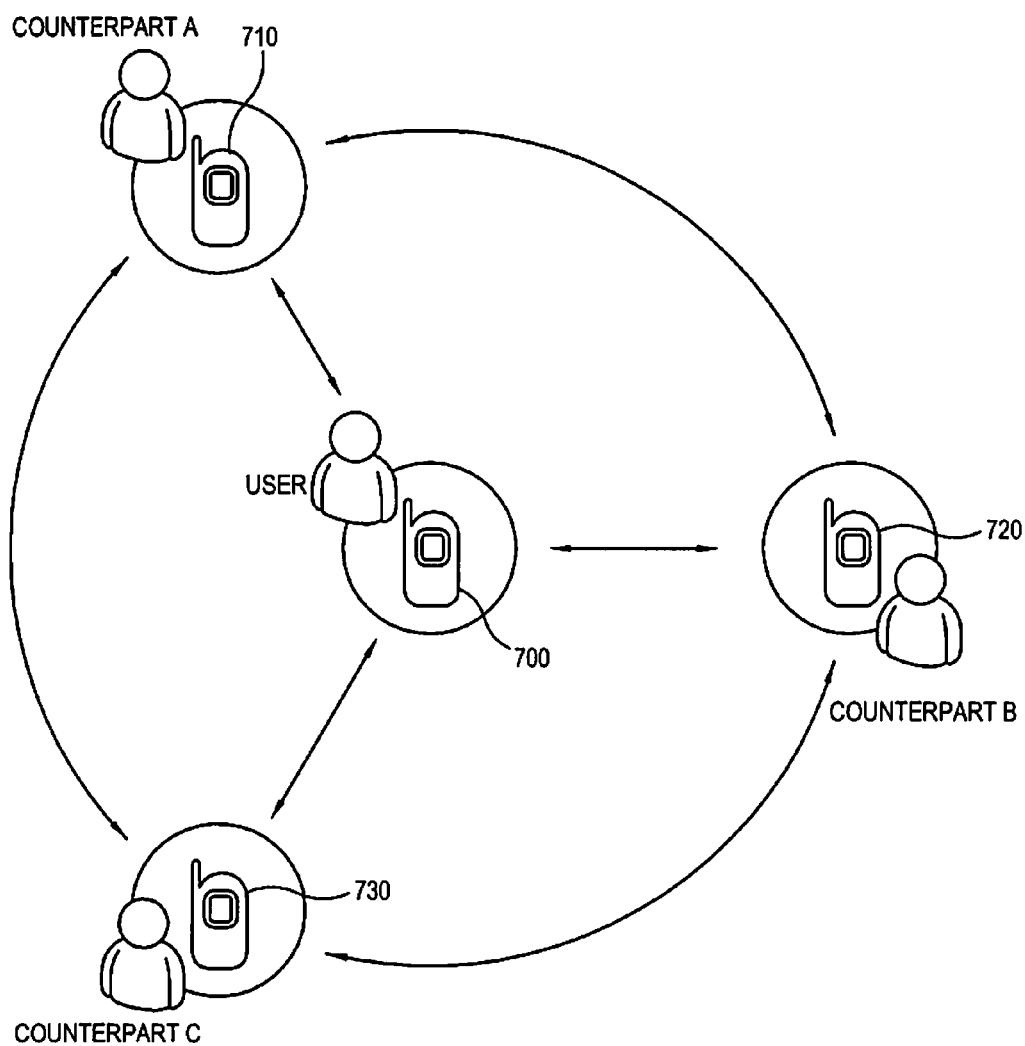
FIG. 7 is a diagram illustrating a community activity network according to another embodiment of the present invention.

FIG. 7 illustrates a network for a community activity according to another embodiment of the present invention.

In FIG. 7, both a mobile device 700 of a user setting up a network and counterpart mobile devices 710, 720, and 730 become a server. That is, a mobile device 710 of a counterpart A, a mobile device 720 of a counterpart B, and a mobile device 730 of a counterpart C communicate with each other, and accordingly all mobile devices 700, 710, 720, and 730 connected to the network may serve as a server or client.

In detail, the mobile device 700 of the user sets up the network to provide services such as an instant game, instant chatting, and sharing information about acquaintances. In an instant game service, a plurality of participants 700, 710, 720, and 730 may play a game at the same time. In instant chatting, an instant discussion room is created for debate and chatting over common issues and interests. In sharing the information about the acquaintances, information may be shared and identified with each other based on a security level of profile information set in the mobile devices 700, 710, 720, and 730 of the plurality of participants.

In the above services, the counterpart mobile devices 710, 720, and 730 transmit and receive information with each other in addition to the mobile device 700 of the user. Thus, mobile device 710 of counterpart A, mobile device 720 of counterpart B, and mobile device 730 of counterpart C communicate with each other.

Figure 8:
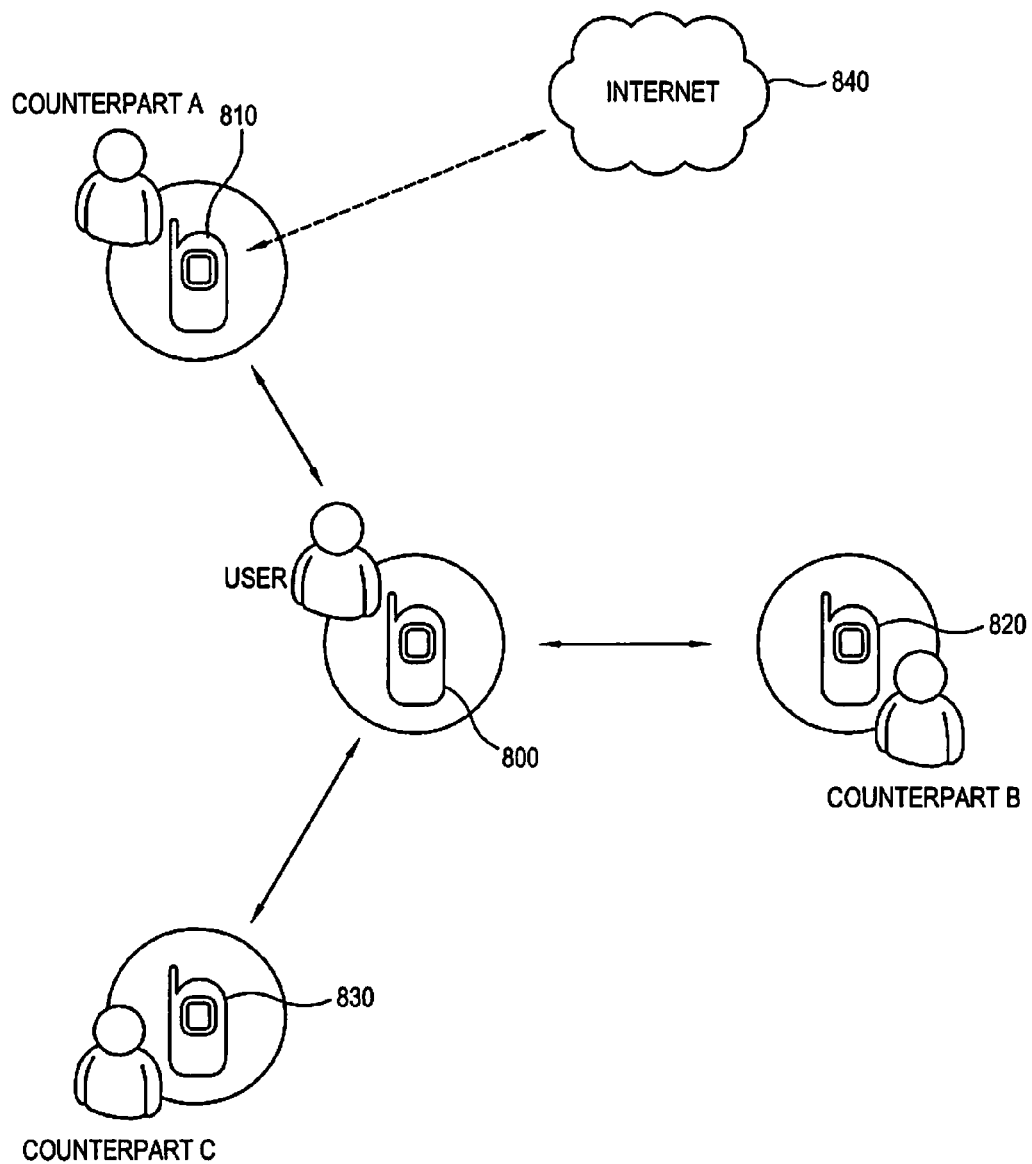
FIG. 8 is a diagram illustrating a community activity network according to still another embodiment of the present invention.

FIG. 8 illustrates a network for a community activity according to still another embodiment of the present invention.

When any one mobile device among a plurality of mobile devices constituting the network is connected to an Internet, the plurality of mobile devices may use the Internet.

In FIG. 8, only mobile device 810 of counterpart A is connected to the Internet. In the past, because mobile device 800 of a user, mobile device 820 of counterpart B, and mobile device 830 of counterpart C are not connected to the Internet, mobile devices 800, 820, and 830 are not provided with services over the Internet.

However, in the present embodiment, mobile device 800 of the user which serves as a server may receive content provided to mobile device 810 of counterpart A connected to the Internet, and may transmit the content to mobile device 820 of counterpart B and mobile device 830 of counterpart C, respectively.

FIG. 9 illustrates a control method of a mobile device according to an embodiment of the present invention.

Mobile device 200 sets up a network for a community activity in step S901.

Mobile device 200 communicates with a plurality of counterpart mobile devices in step S902.

Mobile device 200 searches for at least one counterpart mobile device having a profile corresponding to a profile of a user among a plurality of connectable counterpart mobile devices in step S903. Here, mobile device 200 transmits a request signal for a profile to the plurality of connectable counterpart mobile devices, selects at least one counterpart mobile device having a profile corresponding to the profile of the user among profiles received in response to the request signal, and displays a list or an icon of at least one a counterpart mobile device on a display unit.

Mobile device 200 requests that a found counterpart mobile device participates in the network for the community activity in step S904. Mobile device 200 may transmit a request signal for participation in the network to at least one counterpart mobile device selected from a list of at least one displayed counterpart mobile display when requesting the participation in the network.

Mobile device 200 receives input by the user in step S905.

Mobile device 200 performs the community activity with at least one counterpart mobile device, which accepts the request based on the input by the user in step S906. Here, mobile device 200 may perform the community activity by constituting a network with at least one counterpart mobile device, which transmits an acceptance signal in response to the request signal for the participation in the network.

Although embodiments have been shown and described, it will be appreciated by those skilled in the art that changes may be made in these embodiments without departing from the principles and spirit of the invention, the scope of which is defined in the appended claims.

What is claimed is:

1. A mobile device comprising:
    a communication unit to communicate with at least one counterpart mobile device;
    a user input unit to receive an input signal from a user;
    a user interface (UI) generating unit to generate a first UI and a second UI, the first UI for performing an activity with the at least one counterpart mobile device participating in a group network from the at least one counterpart mobile device, wherein at least one of the first UI and the second UI comprises a sub-menu for setting a right of performing a selected activity of the at least one mobile device participating in the group network;
    a display unit which displays the first UI and the second UI generated by the UI generating unit thereon; and
    a control unit which controls to perform the selected activity with a selected counterpart mobile device, when a selection signal of the user is received from the user input unit through the first UI and the second UI.

2. The mobile device according to claim 1, wherein the UI generating unit generates the second UI for requesting to participate in the group network to the at least one counterpart mobile device connectable with the communication unit, and the control unit controls to transmit the request to participate in the group network to the at least one counterpart mobile device selected through the second UI.

3. The mobile device according to claim 2, wherein the second UI displays the at least one counterpart mobile device having a profile corresponding to a user profile from the at least one counterpart mobile device connectable with the communication unit.

4. The mobile device according to claim 3, wherein the user profile comprises at least one of an application being implemented, content being implemented, a preferred application, and preferred content.

5. The mobile device according to claim 1, wherein the first UI comprises a fourth sub-menu for requesting to participate in the group network to the at least one counter mobile device which does not participate in the group network from the at least one counterpart mobile device connectable with the communication unit.

6. The mobile device according to claim 1, wherein the UI generating unit outputs a notice, when device information of the at least one counterpart mobile device participating in the group network is changed.

7. The mobile device according to claim 1, wherein the activity comprises at least one of joint implementation of an application, sharing content implemented by the user with another user, transmitting and receiving content between users, joint implementation of a game, joint chatting, an activity where a plurality of users watch a broadcast reproduced by any user at the same time, and an activity where any user transmits content to a plurality of users in a broadcasting method.

8. The mobile device according to claim 1, wherein the first UI comprises a first sub-menu for selecting at least one activity from the at least one activity being performed with the at least one counterpart mobile device participating in the group network, and a second sub-menu for selecting at least one counterpart mobile device to perform the selected activity.

9. The mobile device according to claim 8, wherein the second sub-menu comprises a sub-menu for selecting at least one sub-group each of which comprising the at least one counterpart mobile device to perform the selected activity, and the sub-groups are classified on the basis of the right of performing the activity set through the third sub-menu.

10. The mobile device according to claim 9, wherein, the UI generating unit displays a sub-menu for selecting at least one mobile device included in the selected sub-group, when at least one sub-group is selected from the sub-groups through the second sub-menu.

11. A method of providing a mobile device with a user interface, the method comprising:
    displaying a first user interface (UI) and a second UI, the first UI for performing an activity with the at least one counterpart mobile device participating in a group network from the at least one counterpart mobile device, and at least one of the first UI and the second UI comprising a sub-menu for setting a right of performing a selected activity of the at least one mobile device participating in the group network;
    receiving a selection signal of at least one activity through the first UI;
    receiving a selection signal of at least one counterpart mobile device through the second UI; and
    performing the selected activity with the selected counterpart mobile device according to the signal selected through the first UI and the second UI.

12. The method according to claim 11, further comprising:
    generating the second UI for requesting to participate in the group network to the at least one counterpart mobile device connectable with the mobile device; and
    transmitting the request to participate in the group network to the at least one counterpart mobile device selected through the second UI.

13. The method according to claim 12, wherein the second UI displays the at least one counterpart mobile device having a profile corresponding to a user profile from the at least one counterpart mobile device connectable with the communication unit.

14. The method according to claim 13, wherein the user profile comprises at least one of an application being implemented, content being implemented, a preferred application, and preferred content.

15. The method according to claim 11, wherein the first UI comprises a fourth sub-menu for requesting to participate in the group network to the at least one counter mobile device which does not participate in the group network from the at least one counterpart mobile device connectable with the communication unit.

16. The method according to claim 11, further comprising:
    outputting a notice, when device information of the at least one counterpart mobile device participating in the group network is changed.

17. The method according to claim 11, wherein the activity comprises at least one of joint implementation of an application, sharing content implemented by a user with another user, transmitting and receiving content between users, joint implementation of a game, joint chatting, an activity where a plurality of users watch a broadcast reproduced by any user at the same time, and an activity where any user transmits content to a plurality of users in a broadcasting method.

18. The method according to claim 11, wherein the first UI comprises a first sub-menu for selecting at least one activity from the at least one activity being performed with the at least one counterpart mobile device participating in the group network, and a second sub-menu for selecting the at least one counterpart mobile device to perform the selected activity.

19. The method according to claim 18, wherein the second sub-menu comprises a sub-menu for selecting at least one sub-group each of which comprising at least one counterpart mobile device to perform the selected activity, and the sub-groups are classified on the basis of the right of performing the activity set through the third sub-menu.

20. The method according to claim 19, further comprising:
   displaying a sub-menu for selecting the at least one counterpart mobile device included in the selected sub-group, when at least one sub-group is selected from the sub-groups through the second sub-menu.

* * * * *